United States Patent
Tendolkar et al.

(10) Patent No.: US 11,687,708 B2
(45) Date of Patent: Jun. 27, 2023

(54) GENERATOR FOR SYNTHESIZING TEMPLATES

(71) Applicant: Microsoft Technology Licensing, LLC, Redmond, WA (US)

(72) Inventors: Gaurav Vinayak Tendolkar, San Jose, CA (US); Amit Srivastava, San Jose, CA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 17/486,121

(22) Filed: Sep. 27, 2021

(65) Prior Publication Data
US 2023/0102210 A1    Mar. 30, 2023

(51) Int. Cl.
| | | |
|---|---|---|
| *G06F 3/048* | (2013.01) | |
| *G06F 40/186* | (2020.01) | |
| *G06F 3/0484* | (2022.01) | |
| *G06F 3/0481* | (2022.01) | |
| *G06F 9/451* | (2018.01) | |

(52) U.S. Cl.
CPC .......... *G06F 40/186* (2020.01); *G06F 3/0481* (2013.01); *G06F 3/0484* (2013.01); *G06F 9/451* (2018.02)

(58) Field of Classification Search
CPC .............................. G06F 40/186; G06F 9/451
See application file for complete search history.

(56) References Cited

U.S. PATENT DOCUMENTS

| | | | |
|---|---|---|---|
| 8,078,963 B1 * | 12/2011 | Rosner | G06F 40/186 715/255 |
| 10,846,336 B2 | 11/2020 | Edge | |
| 10,915,705 B1 * | 2/2021 | Wehrman | G06F 3/0482 |
| 11,244,106 B2 * | 2/2022 | Jauhar | G06F 40/186 |
| 2003/0014442 A1 * | 1/2003 | Shiigi | G06F 8/20 715/255 |
| 2003/0195765 A1 * | 10/2003 | Sehgal | G06F 16/25 705/1.1 |

(Continued)

OTHER PUBLICATIONS

Prautsch et al., Generators, Templates, and Code Generation for Flexible Automation of Array-Style Layouts, 2021, IEEE, 4 pages.*

(Continued)

*Primary Examiner* — Linh K Pham

(57) ABSTRACT

Non-limiting examples of the present disclosure describe systems, methods, and devices for generating a design layout. In an embodiment, a design generator may present one or more templates comprising one or more design elements. In response to a selection of one or more of the templates, the design generator may generate a variation vector based on similarities and/or differences between the one or more design elements. In an embodiment, the design generator may generate a layering vector based on the one or more design elements. In response to subsequent selections, the design generator may generate subsequent templates by implementing the variation vector and/or the layering vector in association with the selected template(s). The design generator may store and/or otherwise capture the features of a selected template, and apply the features to future design projects.

20 Claims, 7 Drawing Sheets

(56) References Cited

U.S. PATENT DOCUMENTS

| | | | | |
|---|---|---|---|---|
| 2007/0077665 | A1* | 4/2007 | Bump | G06F 3/0484 438/14 |
| 2007/0079236 | A1* | 4/2007 | Schrier | G06F 40/114 715/209 |
| 2012/0070073 | A1* | 3/2012 | Kompalli | G06V 30/226 382/159 |
| 2012/0283996 | A1* | 11/2012 | Watson | G06F 30/15 703/1 |
| 2013/0111373 | A1* | 5/2013 | Kawanishi | G06F 16/438 715/762 |
| 2013/0239002 | A1* | 9/2013 | Maloney | G06T 11/60 715/732 |
| 2014/0053063 | A1* | 2/2014 | Cirrincione | G06F 9/45512 715/234 |
| 2014/0122649 | A1* | 5/2014 | Calvin | G06F 16/958 709/218 |
| 2016/0140102 | A1* | 5/2016 | Damera Venkata | G06F 40/10 715/235 |
| 2016/0350580 | A1* | 12/2016 | Pyun | G06T 5/20 |
| 2017/0032554 | A1* | 2/2017 | O'Donovan | G06N 7/01 |
| 2017/0092331 | A1* | 3/2017 | Eppolito | H04N 21/47205 |
| 2018/0174340 | A1* | 6/2018 | Shah | G06T 11/60 |
| 2018/0260433 | A1* | 9/2018 | Ichihashi | G06F 8/30 |
| 2019/0147287 | A1* | 5/2019 | Glover | G06V 10/422 382/209 |
| 2020/0125632 | A1* | 4/2020 | Ning | H04L 51/04 |
| 2020/0320165 | A1* | 10/2020 | Srinivasan | G06V 30/414 |
| 2021/0011896 | A1* | 1/2021 | Huang | G06F 16/906 |
| 2021/0089704 | A1* | 3/2021 | Cotran | G06F 40/103 |
| 2021/0374027 | A1* | 12/2021 | Joglekar | G06F 11/3072 |
| 2021/0406319 | A1* | 12/2021 | Holt | G06N 20/00 |
| 2021/0406511 | A1* | 12/2021 | Braunstorfinger | H04W 12/106 |
| 2022/0215606 | A1* | 7/2022 | Radford | G06F 40/109 |

OTHER PUBLICATIONS

Hartono et al., Automatic Device Layout Generation for Analog Layout Retargeting, 2005, IEEE, 6 pages.*

Kokash et al., Template-based Treemaps to Preserve Spatial Constraints, 2014, IEEE, 11 pages.*

Secretan, et al., "Piebreeder: A Case Study in Collaborative Evolutionary Exploration of Design Space", In Journal of Evolutionary Computation, vol. 19, Issue 3, Sep. 1, 2011, pp. 373-403.

Dayama, et al., "Grids: Interactive Layout Design With Integer Programming", In Proceedings of the CHI Conference on Human Factors in Computing Systems, Apr. 21, 2020, 13 Pages.

O'Donovan, et al., "Designscape: Design With Interactive Layout Suggestions", In Proceedings of the 33rd annual ACM Conference on Human Factors in Computing Systems, Apr. 18, 2015, pp. 1221-1224.

"International Search Report and Written Opinion Issued in PCT Application No. PCT/US22/038987", dated Dec. 5, 2022, 13 Pages.

Todi, et al., "Sketchplore: Sketch and Explore With a Layout Optimiser", In Proceedings of Proceedings of the ACM Conference on Designing Interactive Systems, Jun. 4, 2016, pp. 543-555.

* cited by examiner

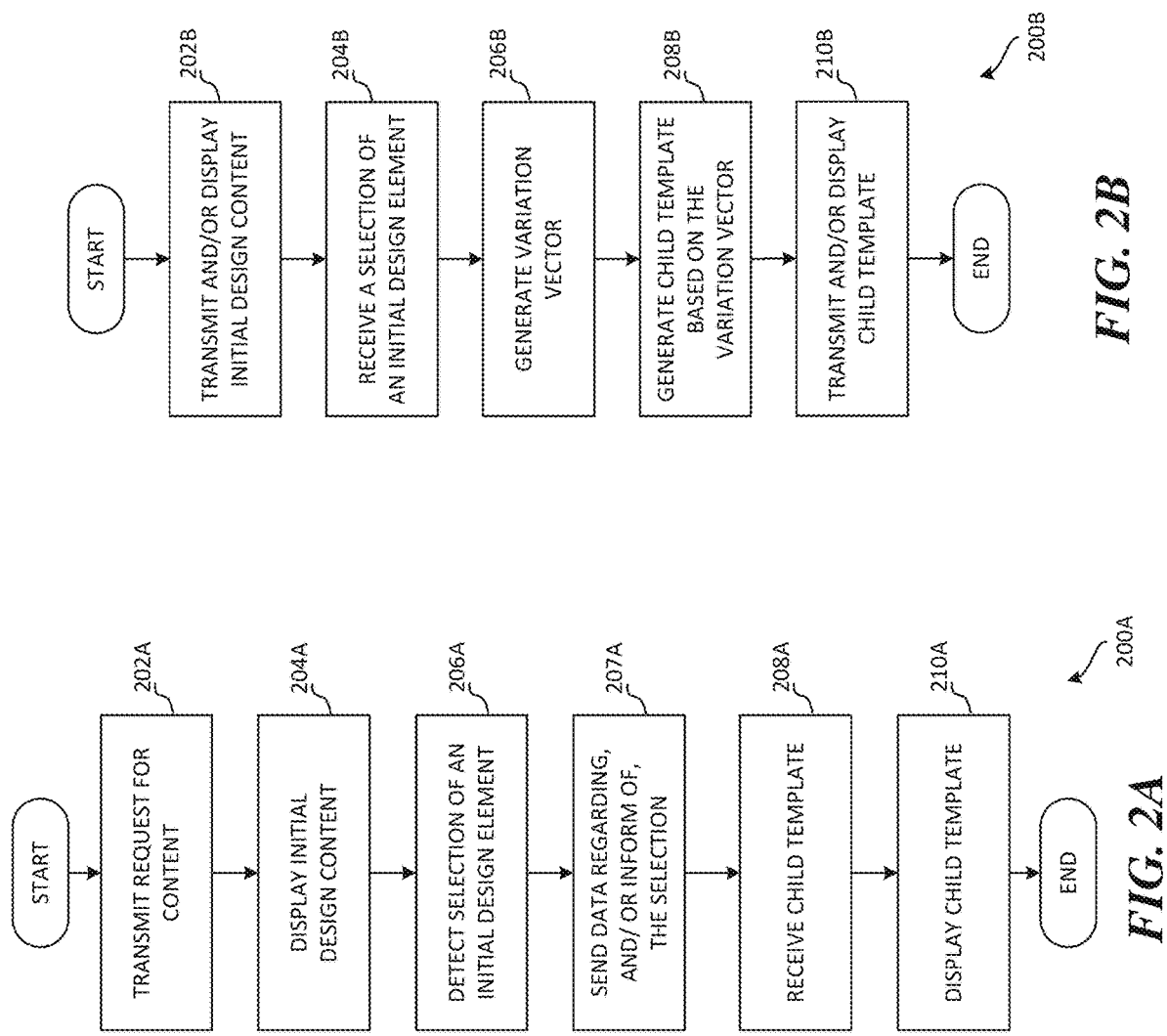

GENERATOR FOR SYNTHESIZING TEMPLATES

BACKGROUND

Layout design includes planning, arranging, and generally blueprinting the different parts of a layout's overall structure. The parts may include headlines, sub-headlines, slogans, illustrations, logos and/or other identifying marks, body text, and the like. A good layout provides a strong coupling between the different parts to gain the attention of readers and/or viewers. Strong coupling generally requires human imagination as well as contextual knowledge of the layout's subject matter. Existing methods of generating layout designs have long suffered from limitations of cost, time required to produce content, and failed attempts to generate strong coupling between the content.

Existing artificial intelligence ("A.I.") solutions may be employed to address at least the cost limitations. However, existing A.I. solutions typically result in a weak coupling between media content and textual content (e.g., text placed generically with a stock image, generic page splits, generic coloring, etc.). Additionally, existing A.I. solutions may limit creativity by conforming content to a uniform template designed for mass adoption that may not be compatible with a brand and/or theme and may further restrict adaptability. Though design arounds may exist for templates generated via existing A.I. solutions, employing the design arounds detracts from the advantages of employing an A.I. solution.

In situations where A.I. may be automated to select a design layout, a function may be implemented to compare two layout options. The A.I. may select the "better" of the two options; but in graphic design, the "better" of the two is subjective, and existing A.I. solutions fail to adequately mimic the artistic creativity of a human imagination.

The subject matter claimed herein is not limited to embodiments that solve any disadvantages or that operate only in the environments described above. Rather, this background is only provided to illustrate an exemplary technology area in which some embodiments described herein may be practiced.

SUMMARY

This summary is provided to introduce a selection of concepts in a simplified form that are further described below in the Detailed Description section. This summary is not intended to identify key features or essential features of the claimed subject matter, nor is it intended to be used as an aid in determining the scope of the claimed subject matter. Additional aspects, features, and/or advantages of examples will be set forth in part in the description which follows and, in part, will be apparent from the description or may be learned by practice of the disclosure.

Non-limiting examples of the present disclosure describe systems, methods, and devices for synthesizing templates using a design generator. In response to a request, the design generator may present, via a user interface, initial templates that include one or more design elements. In response to a selection of one or more of the templates, the design generator may identify features of the one or more templates. The design generator may further generate a variation vector based on similarities and/or differences between the features of the selected templates. Based on the variation vector, the design generator may generate additional templates and present the additional templates in the user interface.

In another non-limiting embodiment, design templates may be generated for each layer of a multi-layer graphic. For example, a design template may be generated for a background layer, and a variation vector generated based on characteristics of the background layer. Additional layout designs may be synthesized based on the variation vector and may comprise, for example, a page split layer, text layer, geometric shape layer, and the like.

In another non-limiting embodiment, an input may be received rejecting a set of templates. In response to the input, the design generator may regenerate the variation vector based on a metric value that differs from an initial metric value and reimplement the variation vector to generate a new set of templates. Alternatively, the design generator may use the initial variation vector in conjunction with a different set of template elements (e.g., stored image, stored layer element, variation of a logo, etc.) to generate a new set of templates.

BRIEF DESCRIPTION OF THE DRAWINGS

Non-limiting and non-exhaustive examples are described with reference to the following figures:

FIG. 2A illustrates a method for an implementation of synthesizing template designs using a design generator.

FIG. 2B illustrates a method for an implementation of synthesizing template designs using a design generator.

DETAILED DESCRIPTION

Figure 1:
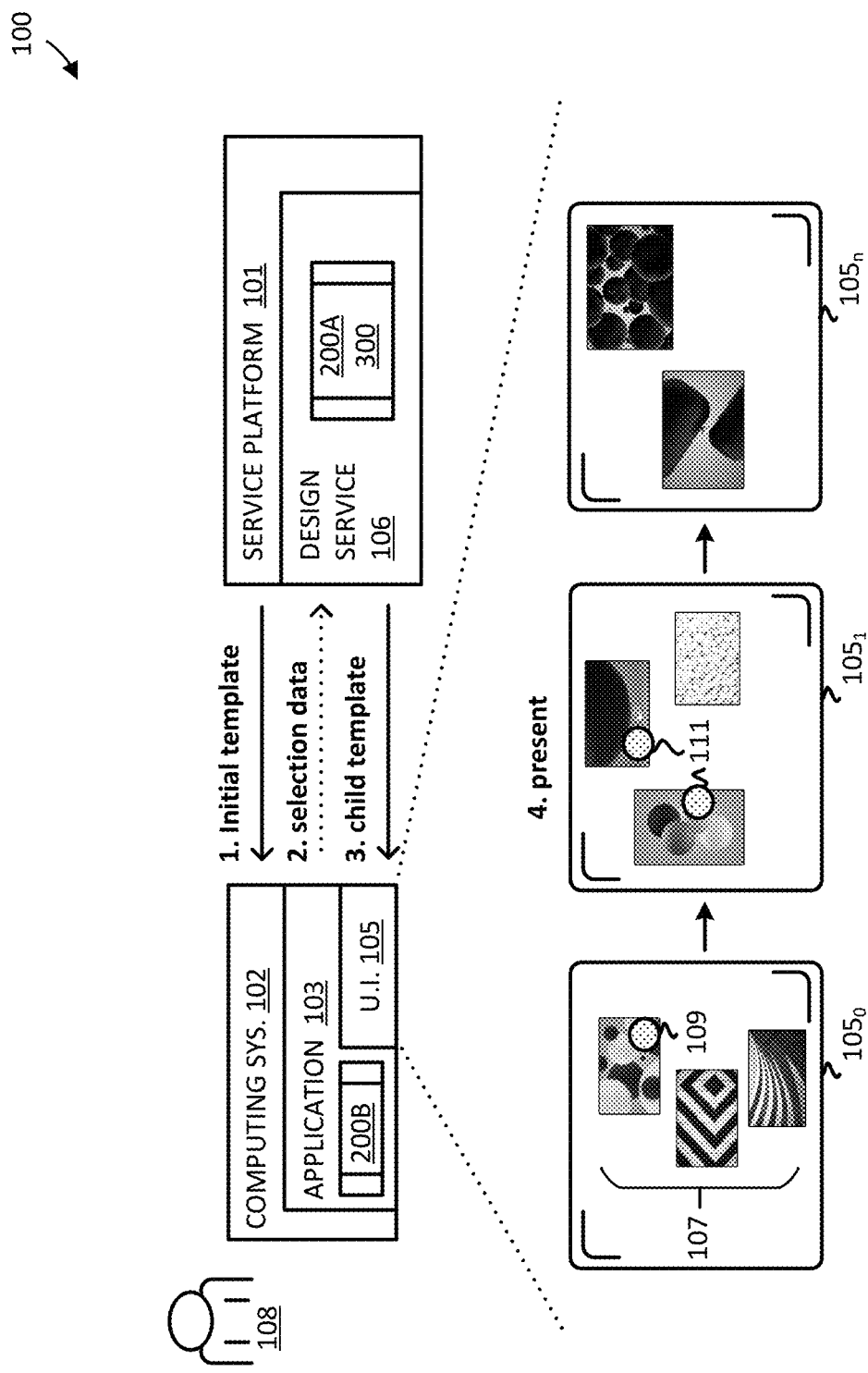
FIG. 1 is a schematic diagram illustrating an example computing environment for executing a design generator.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

Technology is disclosed herein for synthesizing template designs using a design generator. In various implementations, designed content may be generated via native controls of and/or plug-ins to productivity applications (e.g., productivity solutions offered by Microsoft® 365, Google® Workspace, Designs.ai, etc.) executing on a computing device (e.g., personal computer, laptop, smart phone, tablet, etc.). Productivity applications may be used to create productivity documents, digital images, media graphics, logos, ads, banners, flyers, and the like. Examples of productivity documents include but are not limited to word processing documents, spreadsheet documents, note taking documents, electronic messages, slide presentations, websites, and the like. Productivity documents may include digital image elements, media graphic elements, logos, ads, banners, flyers, and the like.

A digital image, media graphic, logo, ad, banner, flyer, etc. may comprise multiple image layers with each layer containing different elements (e.g., pixel placement, color hue, transparency, functionality, font type, curvature features, etc.). An image layer contains properties and/or effects that are specific to a level of the layer. For example, a base/bottom layer may comprise an element unique to the base/bottom layer. A next layer may comprise a subsequent element and may be superimposed on the base/bottom layer. Any number of layers is possible with each subsequent layer being superimposed on the previous layer until the final/top layer is in place. Each layer of the digital image may be manipulated individually or as a group. Any layer may be designed/synthesized before and/or after any other layer (e.g., a third layer of a five layer image may be designed first followed by the fifth layer, the second layer, etc.).

In an embodiment, one or more initial template layouts may be presented in a user interface. The initial template layouts may be derived from a repository of template elements (e.g., stored image, stored layer element, variation of a logo, etc.) and/or based on details provided by a user (e.g., a search term, a theme, an image upload, a document upload, logo, etc.). If an initial set of templates is rejected by a user, then the initial set may be removed from the user interface and replaced with a replacement set of templates.

Subsequent to a selection of one or more of the initial template layouts or the replacement set of templates, a variation vector and/or a layering vector may be generated based on features of the selected template(s). The variation vector and/or layering vector may be employed to generate additional templates (e.g., child templates) by manipulating elements of the selected template(s). Instead of defining a function whereby the "better" of two options is selected by a bot, a design service may analyze the selected template(s) to generate a vector by which varied options may be generated and further refined by a mere click of a mouse.

Subsequent to a selection of one or more of the additional templates, a new variation vector and/or a new layering vector may be generated based on features of the selected additional template(s). The new variation vector and/or new layering vector may be employed to generate subsequent templates (e.g., grandchild templates) by manipulating elements of the selected additional template(s).

If during any iteration of the template generation process, a user rejects a set of templates, the design generator may regenerate the variation vector based on a metric value that differs from an initial metric value. The regenerated variation vector may then be implemented to generate a new set of templates. Alternatively, the design generator may use the initial variation vector in conjunction with a different set of template elements (e.g., stored image, stored layer element, variation of a logo, etc.) to generate a new set of templates.

The systems, methods, and devices described herein provide an improved means for generating designed content. For example, existing A.I. solutions can limit creativity by conforming content to a uniform template designed for mass adoption that may not be compatible with a brand and/or theme. Additionally, existing A.I. solutions may restrict design adaptability thereby restricting generation of unique digital designs. The systems, methods, and devices described herein provide an inventive means over existing solutions by at least generating design layouts based on a variation vector and/or layout vector. The benefits of this novel arrangement include, but are not limited to, improved design generation systems/applications that integrate intelligent generation of unique templates and increase template offerings (e.g., without requiring each iteration be saved to permanent memory), which improves functionality of a design generation system/application. Additional benefits of the technology disclosed herein are contemplated herein and are not expressly recited only for the sake of brevity.

Figures 3A, 3B:
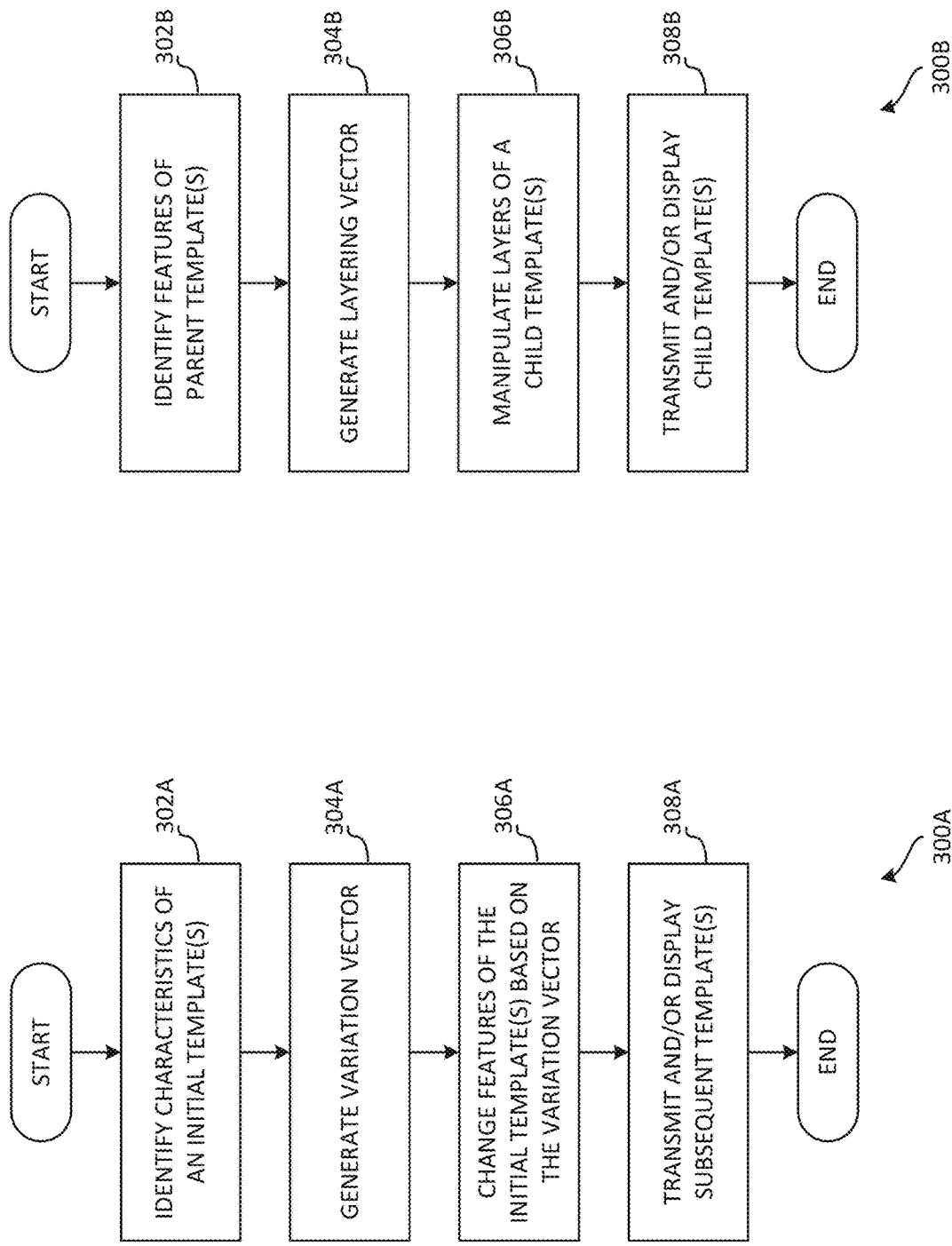
FIG. 3A illustrates a method for an implementation of synthesizing template designs using a design generator.
FIG. 3B illustrates a method for an implementation of synthesizing template designs using a design generator.

Turning now to the drawings, FIG. 1 illustrates a schematic diagram of example computing environment 100 for a design generator. Computing environment 100 includes service platform 101 and computing system 102. Service platform 101 is illustrative of one or more servers that may host one or more application services (e.g., design service 106) and/or data repositories (not shown), of which computing device 600 is representative. Design service 106 is implemented in program instructions that comprise various software modules, components, and other elements of the application. Design operation 200A (as illustrated by process 200A of FIG. 2A), design operation 200B (as illustrated by process 200B of FIG. 2B), variation vector 300A (as illustrated by process 300A of FIG. 3A), and layering vector 300B (as illustrated by process 300B of FIG. 3B) are representative of some of the functionality that may be provided by one or more of the software elements in design service 106. Design service 106 interfaces with various local applications to facilitate content generation, as represented by application 103 on computing system 102. Service platform 101 may communicate with computing system 102 via one or more network connections (not shown), examples of which include internets and intranets, the Internet, wired and wireless networks, low power wireless links, local area networks (LANs), and wide area networks (WANs).

Computing system 102 is representative of any physical or virtual computing resource, or combination thereof, suitable for executing application 103, of which computing device 600 is representative. Examples of computing system 102 include, but are not limited to, personal computers, laptop computers, tablet computers, mobile phones, wearable devices, external displays, virtual machines, and containers, as well as any variation, combination, or collection thereof. Computing system 102 may communicate with service platform 101 via one or more network connections (not shown), examples of which include internets and intranets, the Internet, wired and wireless networks, low power wireless links, local area networks (LANs), and wide area networks (WANs).

Application 103 is implemented in software and, when executed by computing system 101, renders user interface 105. Application 103 is implemented in program instructions that comprise various software modules, components, and other elements of the application. Design operation 200A (as illustrated by process 200A of FIG. 2A), design operation 200B (as illustrated by process 200B of FIG. 2B), variation vector 300A (as illustrated by process 300A of FIG. 3A), and layering vector 300B (as illustrated by process 300B of FIG. 3B) are representative of some of the functionality that may be provided by one or more of the software elements in application 103. Some commercial examples of application 103 include, but are not limited to, Microsoft® PowerPoint®, Prezi®, Google® Slides, Microsoft® Word, Designs.ai, etc. Application 103 may be a locally installed and executed application, a desktop application, a mobile application, a streamed (or streaming) application, a web-based application that is executed in the context of a web-browser, or any other type of application capable of employing design operations 200A and 200B and vectors 300A and 300B.

Design operations 200A and 200B and vectors 300A and 300B may be implemented in program instructions in the context of any of the software applications, modules, components, or other such elements of service platform 101 and/or computing device 102 such as productivity applications, operations system software, application frameworks, and/or other software. The program instructions are executed by one or more processors and may direct service platform 101 and/or computing device 102 to operate as follows, referring parenthetically to the steps in FIGS. 2A and 2B in the context of computing environment 100 for exemplary purposes.

To begin, user 108, via computing system 102, may request content for an initial template layout (e.g., via a search bar in user interface 105). Computing system 102 transmits the request for content to service platform 101 (step 202A). The request for content may comprise text strings and/or images that describe characteristics of a desired template layout (e.g., color hue, theme, shape, font type, curvature, minimalism, etc.). In response to the request for content, service platform 101 may transmit initial design content to computing system 102 (step 202B). The initial design content may include one or more templates that comprise one or more characteristics of the desired template layout.

Subsequent and/or in response to receiving the initial design, computing system 102 may display user interface $105_0$ comprising initial design templates 107 (step 204A). In the present implementation, initial design templates 107 represent selectable design templates that have features (e.g., color hues, image layers, shapes, font types, curvature features, etc.) that differ from one another. User 108 may select one or more of the initial design templates 107 (e.g., input 109), and computing system 102 may detect the selection (step 206A). Subsequent and/or in response to detecting the selection of one or more of the initial design templates 107, computing system 102 may inform service platform 101 of the selection (step 207A).

Subsequent and/or in response to receiving notification of the selection (step 204B), service platform 101 may generate a variation vector and/or a layering vector (e.g., based on the selected one(s) of the initial design elements 107) (step 206B). In the present implementation, the variation vector is a function that detects the presence and/or absence of a feature (e.g., theme), a layout of the feature (e.g., angle of page split line), style of the feature (e.g., color hue, shape, etc.), and the like. The variation vector may incorporate one or more metrics to identify an element of a selected template, generate a replica of the element for manipulation, and/or manipulate the element for presentation in a canvas of a child template. The metric may include a threshold for manipulating the element. The threshold may be a percent deviation from an existing value (e.g., a 45% deviation would maintain 55% of the element's characteristic as presented in the parent template). Example thresholds include, but are not limited to, a threshold for deviating from a background layer element, a page split element, a shape element, a text style element, a color element, and the like.

Service platform 101 may generate a child template by implementing a variation vector and/or a layering vector in association with a selected template (step 208B). For example, service platform 101 may execute a variation vector to manipulate one or more elements of the selected template, and generate a child template comprising the manipulated element(s). Service platform 101 may then transmit the child template to computing system 102 for display in user interface 105 (step 210B).

Subsequent and/or in response to receiving the child template (step 208A), computing system 102 may display the child template in user interface 1051 (step 210A). User 108 may select one or more of the child templates (e.g., input 111). In response to input 111, service platform 101 may generate a new variation vector and/or a new layering vector based on the selected child templates. Service platform 101 may then generate grandchild templates based on the new variation vector and/or the new layering vector, and transmit the grandchild templates to computing system 102 for display in user interface 105.

Subsequent and/or in response to receiving the grandchild templates, computing system 102 may display the grandchild templates in user interface $105_n$. User 108 may select a grandchild template as the final template and/or as a layer of the final template. Alternatively, user 108 may select one or more of the grandchild templates to continue generating subsequent child templates.

Figure 4A:
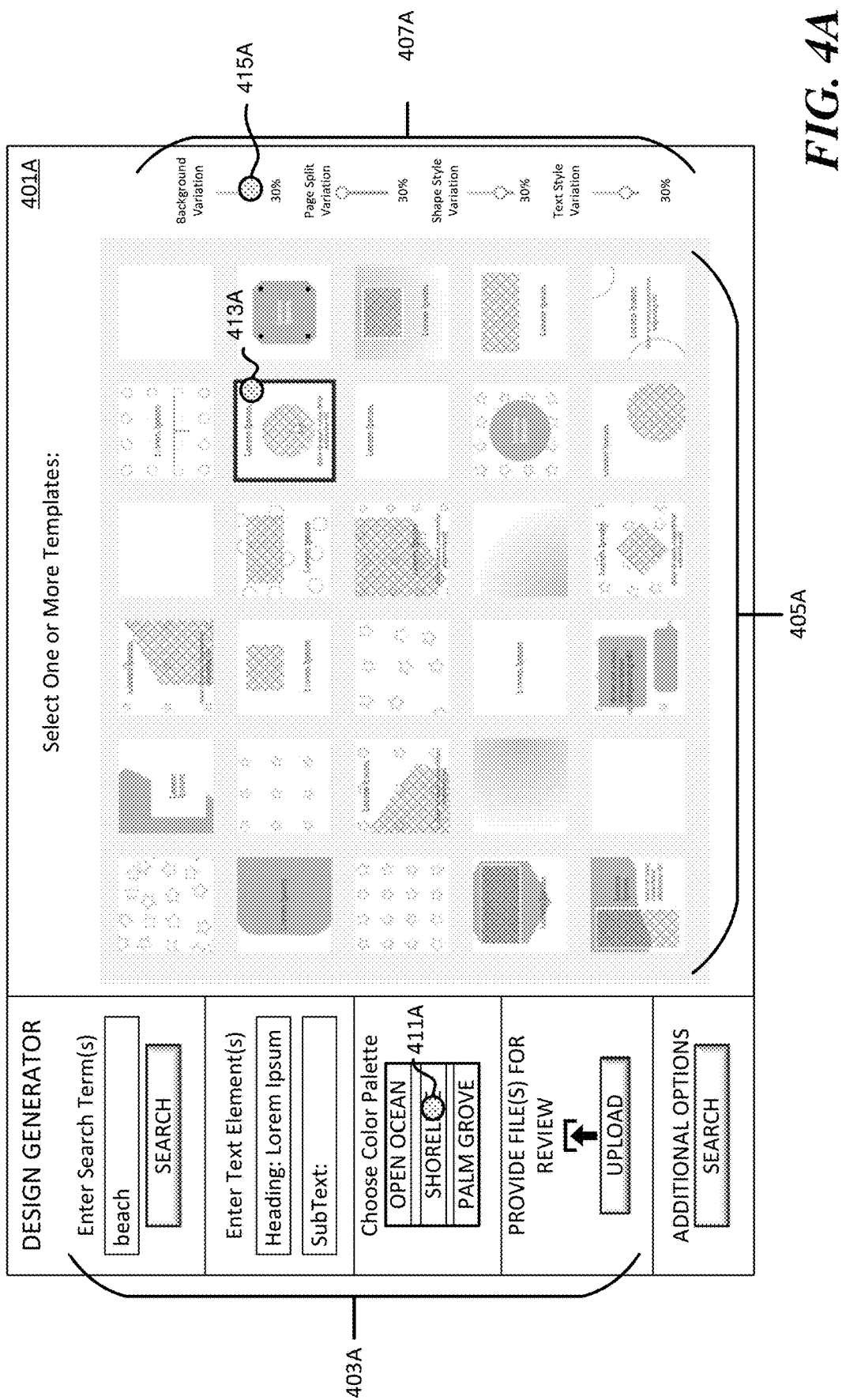
FIG. 4A is a schematic diagram illustrating a graphical user interface in an implementation of a design generator.

FIG. 4A illustrates a schematic diagram of graphical user interface ("GUI") 401A in an implementation of a design generator. GUI 401A may include search criteria 403A, initial set of templates 405A, and metrics 407A. Search criteria 403A may include features for defining design elements that should be included and/or excluded from suggested design templates. In an embodiment, search criteria 403A may include, but is not limited to, a search criteria text box; a button for performing a search on the text string of the text box; a text input box for a heading; a text input box for a subtext; a color palette selector; a text style palette; and a button for uploading images, files, and the like. The content of search criteria 403A may be used to identify elements/features for inclusion the suggested design templates. In the present embodiment, search criteria 403A includes a "beach" search theme, "Lorem Ipsum" as a heading, and "shoreline" as a color palette (as evidenced by input 411A). Search criteria 403A of the present embodiment does not include subtext or any files that were uploaded (e.g., for identifying design features for inclusion in a suggested template). Metrics 407A include slider control elements through which a user may define thresholds and/or degrees of deviation. Though shown as slider control elements, metrics 407A may comprise any interactive control configured to accept an input from a user (e.g., numeric value, text, input 415A, etc.).

Subsequent and/or in response to receiving search criteria 403A, a design service may generate and/or select an initial set of templates 405A to present in user interface 401A. The initial set of templates 405A may be generated from features of files provided by a user and/or from features of files in a repository (e.g., images, templates, layer elements, etc.). The initial set of templates may provide options for a finished graphic and/or a layer of a graphic (e.g., a background layer, foreground, page split, etc.).

If the initial set of templates 405A does not include a desirable template option (e.g., a user does not want to select a template of the initial set of templates), then the user may request generation of a new set of templates (e.g., by selecting the "additional options" search button).

If the initial set of templates 405A includes a desirable template option (e.g., one or more templates include features suitable for a user's needs), then an input may be received via user interface 401A selecting one or more of the initial set of templates (e.g., input 413A). Referring parenthetically to the steps of FIG. 3A in the context of FIG. 4A, a design service may identify characteristics of the selected template(s) (step 302A) and generate a variation vector based on the identified characteristics (step 304A). The variation vector may be generated based on a metric inferred from search criteria 403A and/or values provided by metrics 407A. Metrics may include numerical values, textual values, layer values, percent values, and the like.

In the present example, the variation vector incorporates metrics 407A to change features and/or elements of the selected template(s) for use in a subsequent template (step 306A). The degree of deviation is defined by at least the values of metrics 407A. For example, a variation vector may isolate features and/or elements of a selected template(s) and mutate the features and/or elements according to the degree of deviation. If a page split is detected in a parent template, the variation vector may be implemented to generate a child template with the page split removed, an angle of the page split varied, a color of the page split changed, a shape of the page split mutated, etc. in accordance with metrics 407A and/or the degree of deviation.

The variation vector may comprise a 6×2 dimensional matrix having values between 0 and 1. Each row of the matrix may correspond to a feature and/or element of a selected template. Each feature and/or element may be subdivided into a type (e.g., solid color type, gradient type, patterned type, image type, text type, shape type, etc.) Each feature and/or element may have a custom rule/model to generate variation(s) of the feature and/or element (e.g., within types, across types, based on a single parameter, etc.). Each feature and/or element may be associated with a layer, and the variation vector may order the layers hierarchically (e.g., based on readability, an importance metric of the feature, etc.).

A first column of the matrix may correspond to a probability of the feature and/or element being present in the child template. The second column of the matrix may specify a variation in a layout of the feature and/or element. If a feature and/or element is removed from the child template, then the second column may be ignored. A rule and/or model may incorporate the value in the second column of the corresponding row of the variation vector. The child templates may be generated by implementing the variation vector in association with the parent template (e.g., to output a same order of layers with each layer mutated based on a corresponding value of the variation vector).

The design service may transmit the generated child template(s) (e.g., to a remote computing system) and/or enable display of the child template(s) via a connected user interface (step 308A). At any stage of the design generation, a template may be stored to memory as a finished template, an intermediate template, and the like. The template design generation can proceed from any saved intermediate design. In other words, the design does not have to start with any particular layer.

Figure 4B:
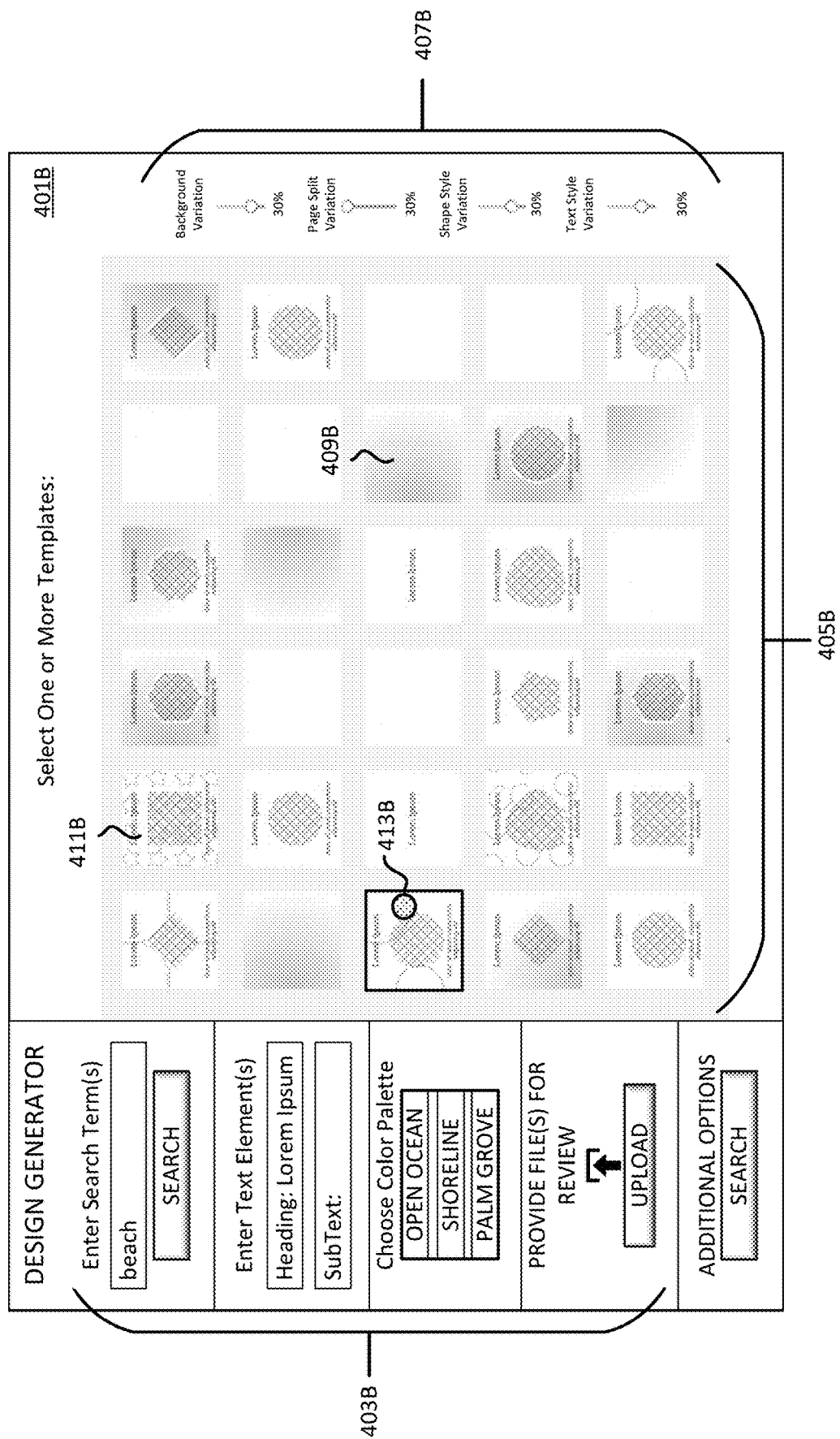
FIG. 4B is a schematic diagram illustrating a graphical user interface in an implementation of a design generator.

FIG. 4B illustrates a schematic diagram of graphical user interface ("GUI") 401B in an implementation of a design generator. Specifically, GUI 401B displays a view generated by the design generator subsequent to input 413A of FIG. 4A. GUI 401B includes search criteria 403B, subsequent set of templates 405B, and metrics 407B. Search criteria 403B reflects the features and input elements of search criteria 403A of FIG. 4A. Though no changes have been made in this subsequent view, it is contemplated herein that a user may elect to alter the features and/or elements of the search criteria in subsequent iterations.

In the present embodiment, the design service employs a variation vector to generate subsequent set of templates 405B. The variation vector may incorporate metrics 407B into its matrix (e.g., to determine a degree of deviation for one or more child templates). When the variation vector is implemented in associated with a parent template (e.g., the parent template selected by input 413A of FIG. 4A), subsequent set of templates 405B may be generated comprising mutated features of the selected parent template. For example, template 409B comprises a background layer having a different color than the background later of the selected parent template of FIG. 4A, and template 411B comprises an additional layer (e.g., geometric shapes) and a mutated image element (e.g., changed from a circle image to a square image) when compared to the selected parent template of FIG. 4A.

In response to a final selection 413B, the design generator may ask the user to verify their desire to save and/or capture the features of the selected template. Subsequent to storing and/or otherwise capturing the features of the selected template, the design generator may apply the captured features to a design project the user is currently creating. Alternatively, the user may access the stored features via the design generator for use in a future design project.

Figure 5:
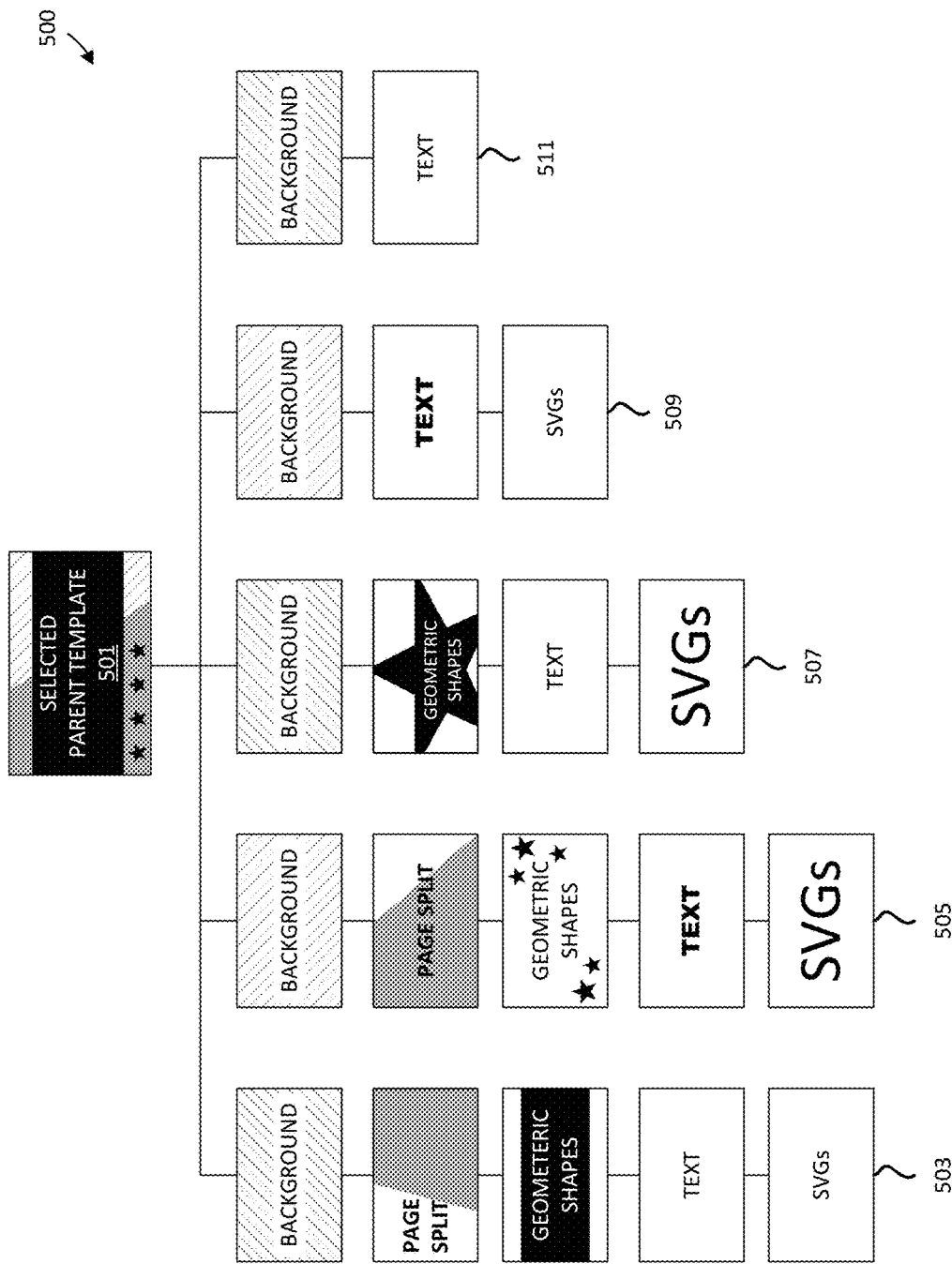
FIG. 5 is a schematic diagram illustrating a layering order in an implementation of a design generator.

FIG. 5 illustrates a layering order 500 in an implementation of a design generator. Referring parenthetically to the steps in FIG. 3B in the context of layering order 500, the design generator may identify features of selected parent template 501 (step 302B). Features of selected parent template 501 may include a background layer (e.g., solid or patterned color, an image, etc.), a page split (e.g., an arc dividing a canvas into a text region and an image region), geometric and/or free form shapes (e.g., added to fill and/or decorate space on a canvas), foreground images (e.g., images of layer placed atop a background layer), text (e.g., heading, subtext, brand text, logo, etc.), scalable vector graphics ("SVGs"), and the like.

Based on the identified features, design generator may create a layering vector (step 304B). The layering vector determines an order of the identified features and coordinates their placement and sizing on a canvas of a child template (e.g., coordinates of a bounding box). The layering vector incorporates at least three metrics: an accessibility metric, a content property metric, and a coverage metric. The accessibility metric may be implemented to ensure elements of the child template are visible and/or legible. For example, the accessibility metric may be implemented to ensure a high contrast between text type features and background type features. The content property metric may be implemented to ensure elements of the child template do not overlap and/or obscure each other more than a threshold amount. The coverage metric may be implemented to ensure that layers of the child template do not overlap and/or obscure each other more than a threshold amount. The threshold values may be based on a random and/or assigned value, based on an amount of overlap observed in the parent template, and the like.

The layering vector may be implemented to manipulate layers of child templates 503-511 (step 306B). For example, a layering vector may add layer(s) to a child template that may not have been present in selected parent template 501 and/or may remove layer(s) that were present in selected parent template 501. In an embodiment, a design service may implement a layering vector to add, remove, and/or manipulate layers to satisfy constraints of text legibility (e.g., to remove and/or avoid overlaps of content). For example, if a page split is detected in selected parent template 501, the layering vector may generate a child template with the page split removed (e.g., child templates 507-511) or manipulated (e.g., child templates 503 and 505).

If a page split is omitted from a parent template, then the layering vector may generate a child template that includes a page split.

The design service may transmit (e.g., to a remote computing system) and/or enable display of the child templates 503-511 via a connected user interface (step 308B). At any stage of the design generation, a template may be stored to memory as a finished template, an intermediate template, and the like. The template design generation can proceed from any saved intermediate design. In other words, the design does not have to start with any particular layer.

Figure 6:
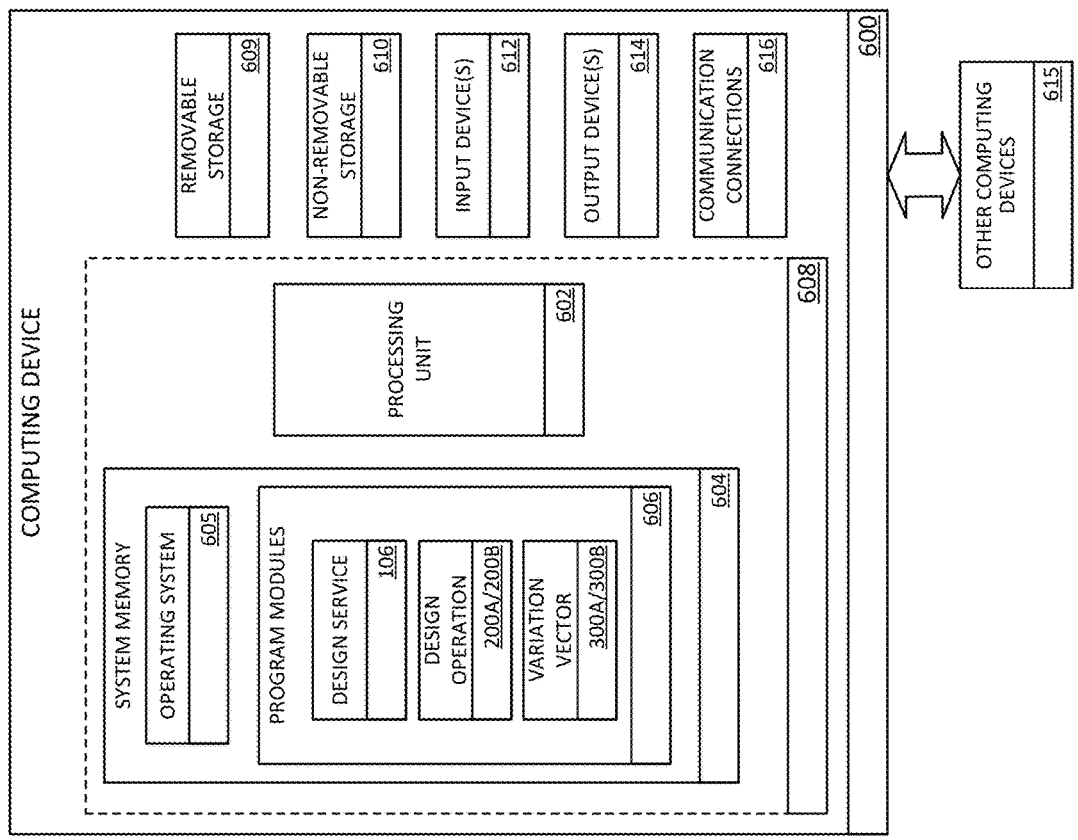
FIG. 6 is a simplified block diagram of a distributed computing system in which aspects of the present disclosure may be practiced.

FIG. 6 is a block diagram illustrating physical components (e.g., hardware) of a computing device 600 with which aspects of the disclosure may be practiced. The computing device components described below may have computer executable instructions for coordinating productivity tools across companion devices. In a basic configuration, the computing device 600 may include at least one processing unit 602 and a system memory 604. Depending on the configuration and type of computing device, the system memory 604 may comprise, but is not limited to, volatile storage (e.g., random access memory), non-volatile storage (e.g., read-only memory), flash memory, or any combination of such memories. The system memory 604 may include an operating system 605 suitable for running one or more companion device processing programs. The operating system 605, for example, may be suitable for controlling the operation of the computing device 600. Furthermore, embodiments of the disclosure may be practiced in conjunction with a graphics library, other operating systems, or any other application program and is not limited to any particular application or system. This basic configuration is illustrated in FIG. 6 by those components within a dashed line 608. The computing device 600 may have additional features or functionality. For example, the computing device 600 may also include additional data storage devices (removable and/or non-removable) such as, for example, magnetic disks, optical disks, or tape. Such additional storage is illustrated in FIG. 6 by a removable storage device 609 and a non-removable storage device 610.

As stated above, a number of program modules and data files may be stored in the system memory 604. While executing on the processing unit 602, the program modules 606 may perform processes including, but not limited to, the aspects, as described herein. Program modules 606 may include design service 106, design operations 200A and 200B, and variation vectors 300A and 300B, which may be deployed as described in FIGS. 1-5 herein.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 6 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 600 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general-purpose computer or in any other circuits or systems.

The computing device 600 may also have one or more input device(s) 612 such as a keyboard, a mouse, a pen, a sound or voice input device, a touch or swipe input device, a gesture or visual input device, etc. The output device(s) 614 such as a display, speakers, a printer, etc. may also be included. The aforementioned devices are examples and others may be used. The computing device 600 may include one or more communication connections 616 allowing communications with other computing devices 615. Examples of suitable communication connections 616 include, but are not limited to, radio frequency (RF) transmitter, receiver, and/or transceiver circuitry; universal serial bus (USB), parallel, and/or serial ports.

The term computer readable media as used herein may include computer readable storage media. Computer storage media may include volatile and nonvolatile, removable, and non-removable media implemented in any method or technology for storage of information, such as computer readable instructions, data structures, or program modules. The system memory 604, the removable storage device 609, and the non-removable storage device 610 are all computer storage media examples (e.g., memory storage). Computer storage media may include RAM, ROM, electrically erasable read-only memory (EEROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information, and which can be accessed by the computing device 600. Any such computer storage media may be part of the computing device 600. Computer readable media does not include a carrier wave or other propagated or modulated data signal. Computer readable storage device does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present disclosure, one skilled in the art may envision variations, modifications, and alternate aspects falling within the spirit of the broader aspects of the general inventive concept embodied in this application that do not depart from the broader scope of the claimed disclosure.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

What is claimed is:

1. A computer device comprising:
   one or more computer readable media;
   one or more processors operatively coupled with the one or more computer readable media; and
   program instructions stored on the one or more computer readable media that, when executed by the one or more processors, direct the computing device to at least:
   display a user interface to an application, wherein the user interface includes an initial set of templates;
   receive a selection of a parent template from the initial set of templates;
   generate a variation vector based on the parent template, wherein the variation vector identifies elements of the parent template and thresholds for manipulating the elements to produce child templates that vary relative to the parent template and to each other;
   generate the child templates based on the variation vector, the parent template, and a layering vector that adds a layer to a design layout, wherein the layer is not present in the initial set of templates; and
   display the child templates in the user interface.

2. The computing device of claim 1 wherein the program instructions further direct the computing device to:
   receive a selection of a child template of the child templates;
   generate a new variation vector based on the child template, wherein the new variation vector identifies elements of the child template and thresholds for manipulating the elements to produce grandchild templates that vary relative to the child template and to each other;
   generate grandchild templates based on the new variation vector and the child template; and
   display the grandchild templates in the user interface.

3. The computing device of claim 2 wherein the child template is associated with a first layer of the design layout and the grandchild templates are associated with a second layer of the design layout, wherein the first layer is distinguished from the second layer.

4. The computing device of claim 1 wherein the variation vector comprises a metric used to identify a given element of the elements, generate a replica of the given element for manipulation, or manipulate the given element.

5. The computing device of claim 4 wherein the metric is derived from a user defined threshold.

6. The computing device of claim 1 wherein the variation vector comprises a matrix, wherein each row of the matrix corresponds to an element of the elements of the parent template, and wherein, for a given row of the matrix, a first column comprises a probability that the corresponding element is present in the child template and a second column comprises a variation in a layout of the corresponding element in the child template.

7. The computing device of claim 1 wherein the layering vector comprises an accessibility metric indicating a legibility of the elements of the child template.

8. A method of operating a computing device comprising:
   enabling display of a user interface to an application, wherein the user interface includes an initial set of templates;
   receiving a selection of a parent template from the initial set of templates;
   generating a variation vector based on the parent template, wherein the variation vector identifies elements of the parent template and thresholds for manipulating the elements to produce child templates that vary relative to the parent template and to each other;
   generating the child templates based on the variation vector, the parent template, and a layering vector that adds a layer to a design layout, wherein the layer is not present in the initial set of templates; and
   enabling display of the child templates in the user interface.

9. The method of claim 8 further comprising:
   receiving a selection of a child template of the child templates;
   generating a new variation vector based on the child template, wherein the new variation vector identifies elements of the child template and thresholds for manipulating the elements to produce grandchild templates that vary relative to the child template and to each other;
   generating the grandchild templates based on the new variation and the child template; and
   enabling display of the grandchild templates in the user interface.

10. The method of claim 9 wherein the child template is associated with a first layer of the design layout and the grandchild templates are associated with a second layer of the design layout, wherein the first layer is distinguished from the second layer.

11. The method of claim 8 wherein the variation vector comprises a metric used to identify a given element of the elements, generate a replica of the given element for manipulation, or manipulate the given element.

12. The method of claim 11 wherein the metric is derived from a user defined threshold.

13. The method of claim 8 wherein the variation vector comprises a matrix, wherein each row of the matrix corresponds to an element of the elements of the parent template, and wherein, for a given row of the matrix, a first column comprises a probability that the corresponding element is present in the child template and a second column comprises a variation in a layout of the corresponding element in the child template.

14. The method of claim 8 wherein the layering vector comprises an accessibility metric indicating a legibility of the elements of the child template.

15. One or more computer readable media having program instructions stored thereon that, when executed by one or more processors, direct a computing device to at least:
- transmit an initial set of templates for display in a user interface;
- receive a selection of a parent template from the initial set of templates;
- generate a variation vector based on the parent template, wherein the variation vector identifies elements of the parent template and thresholds for manipulating the elements to produce child templates that vary relative to the parent template and to each other;
- generate the child templates based on the variation vector, the parent template, and a layering vector that adds a layer to a design layout, wherein the layer is not present in the initial set of templates; and
- transmit the child templates for display in the user interface.

16. The one or more computer readable media of claim 15 wherein the program instructions further direct the computing device to:
- receive a selection of a child template of the child templates;
- generate a new variation vector based on the child template, wherein the new variation vector identifies elements of the child template and thresholds for manipulating the elements to produce grandchild templates that vary relative to the child template and to each other;
- generate grandchild templates based on the new variation vector and the child template; and
- transmit the grandchild templates for display in the user interface.

17. The one or more computer readable media of claim 15 wherein the variation vector comprises a metric used to identify a given element of the elements, generate a replica of the given element for manipulation, or manipulate the given element.

18. The one or more computer readable media of claim 17 wherein the metric is derived from a user defined threshold.

19. The one or more computer readable media of claim 15 wherein the variation vector comprises a matrix, wherein each row of the matrix corresponds to an element of the elements of the parent template, and wherein, for a given row of the matrix, a first column comprises a probability that the corresponding element is present in the child template and a second column comprises a variation in a layout of the corresponding element in the child template.

20. The one or more computer readable media of claim 15 wherein the layering vector comprises an accessibility metric indicating a legibility of the elements of the child template.

* * * * *